US007200638B2

(12) United States Patent
Lake

(10) Patent No.: US 7,200,638 B2
(45) Date of Patent: Apr. 3, 2007

(54) SYSTEM AND METHOD FOR AUTOMATIC POPULATION OF INSTANT MESSENGER LISTS

(75) Inventor: John M. Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 10/684,986

(22) Filed: Oct. 14, 2003

(65) Prior Publication Data

US 2005/0080859 A1 Apr. 14, 2005

(51) Int. Cl.
*G06F 15/16* (2006.01)
(52) U.S. Cl. .................. 709/206; 709/203; 709/205; 709/219; 709/224; 709/245; 707/3; 707/10
(58) Field of Classification Search ........... 709/223, 709/203–206, 217, 219, 224, 245; 707/10, 707/3; 455/432.1; 715/758
See application file for complete search history.

(56) References Cited

U.S. PATENT DOCUMENTS

| | | | |
|---|---|---|---|
| 6,049,776 A * | 4/2000 | Donnelly et al. ........... 705/8 |
| 6,366,962 B1 | 4/2002 | Teibel ........................ 709/245 |
| 6,785,681 B2 * | 8/2004 | Keskar et al. .............. 707/10 |
| 2001/0013050 A1 | 8/2001 | Shah .......................... 709/202 |
| 2001/0033298 A1 | 10/2001 | Slotznick .................... 345/758 |
| 2002/0107931 A1 | 8/2002 | Singh et al. ................ 709/206 |
| 2002/0119789 A1 | 8/2002 | Friedman .................... 455/456 |
| 2003/0105820 A1 * | 6/2003 | Haims et al. ............... 709/205 |
| 2003/0220976 A1 * | 11/2003 | Malik ......................... 709/206 |
| 2003/0220977 A1 * | 11/2003 | Malik ......................... 709/206 |
| 2004/0103156 A1 * | 5/2004 | Quillen et al. ............. 709/206 |

(Continued)

FOREIGN PATENT DOCUMENTS

WO WO 01/43357 12/2000

(Continued)

OTHER PUBLICATIONS

Nick Clayton, "New to the net No. 15: Here comes the messenge", The Scotsman, Edinburgh ( UK), Apr. 24, 2000, p. 18. Document URL: http://proquest.umi.com/pqdweb?did=52834601&sid=1&Fmt=3&clientId=19649&RQT=309&VName=PQD.*

(Continued)

*Primary Examiner*—Saleh Najjar
*Assistant Examiner*—Oanh Duong
(74) *Attorney, Agent, or Firm*—Van Leeuwen & Van Leeuwen; Gerald R. Woods

(57) ABSTRACT

A system and method that automatically adds contacts to a user's instant messaging buddy list is provided. The contacts are added based upon existing database (i.e., directory) information as well as meeting information extracted from the user's calendar. The list of calendar contacts is included with the user's calendar. This list is used to automatically populate the user's buddy list. In one embodiment, a buddy list "group" is initialized for calendar entries. Contacts are also added to a user's buddy list through database queries. The group of contacts resulting from the query are then added to the user's buddy list. Contacts added to the user's buddy list through the user's calendar or through database queries can be made permanent or temporary. Temporary contacts are automatically removed after a specified period of time.

21 Claims, 9 Drawing Sheets

U.S. PATENT DOCUMENTS

| | | | |
|---|---|---|---|
| 2004/0153506 A1* | 8/2004 | Ito et al. | 709/204 |
| 2004/0172456 A1* | 9/2004 | Green et al. | 709/207 |
| 2004/0203381 A1* | 10/2004 | Cahn et al. | 455/41.2 |
| 2004/0203746 A1* | 10/2004 | Knauerhase et al. | 455/432.1 |
| 2005/0027805 A1* | 2/2005 | Aoki | 709/206 |
| 2005/0038856 A1* | 2/2005 | Krishnasamy et al. | 709/206 |
| 2005/0071435 A1* | 3/2005 | Karstens | 709/207 |
| 2005/0083851 A1* | 4/2005 | Fotsch | 370/252 |
| 2005/0091272 A1* | 4/2005 | Smith et al. | 707/104.1 |
| 2005/0198172 A1* | 9/2005 | Appelman et al. | 709/206 |

FOREIGN PATENT DOCUMENTS

| | | |
|---|---|---|
| WO | WO 02/05106 | 7/2001 |

OTHER PUBLICATIONS

Fontana, J., Lotus plays fair in linking instant messaging product to AOL:, Network World, Jul. 1999.*

Nardi et al., "Interaction and Outeraction: Instant Messaging in Action," CMCA, Dec. 2000, p. 79-88.

Isaacs et al., "Hubbub: A sound-enhanced mobile instant messenger that supports awareness and opportunistic interactions," CHI, vol. 4, No. 1, Apr. 2002, p. 179-186.

Godefroid et al., "Ensuring Privacy in Presence Awareness Systems: An Automated Verification Approach," p. 59-68.

Herbsleb et al., "Introducing Instant Messaging and Chat in the Workplace," CHI, vol. 4, No. 1, Apr. 2002, p. 171-178.

Bayardo Jr. et al., "YouServ: A Web-Hosting and Content Sharing Tool for the Masses," WWW, May 2002, p. 345-354.

Steinfield et al., "Supporting Virtual Team Collaboration: The TeamSCOPE System," GROUP, 1999, p. 81-90.

Jones, Stephen, "The Collaborative Virtual Workspace." 8 pgs, (Internet Article printed Dec. 27, 2002.

"Linking Instant Messaging to Publish/Subscribe Messaging," IBM Research Disclosure, Oct. 2000 (p. 1875).

"Propagation of Identity Throughout Object Cliques," IBM Research Disclosure, May 2001 (p. 861).

* cited by examiner

SYSTEM AND METHOD FOR AUTOMATIC POPULATION OF INSTANT MESSENGER LISTS

BACKGROUND OF THE INVENTION

1. Technical Field

The present invention relates in general to a method and system for populating instant messenger (IM) lists. More particularly, the present invention relates to a system and method for populating IM lists based upon query results and user calendar data.

2. Description of the Related Art

Instant messaging has become a critical communications technology for many users and organizations. Instant messaging allows a user to create a "session" with one or more other users so that messages can be sent back and forth contemporaneously. The flow of messages in an instant message session creates a dialog between the user and other users with whom the user has established a session. In this manner, quick messages can be transmitted without sending an email message or telephoning the other user. Users can choose whether and when to respond to instant messages, much like an email message. However, unlike email messages, in instant messaging, a window is displayed on the user's display showing the messages between the user and another user.

A typical use of instant messaging is the ability to engage in "off-line" discussions during a telephone conference call. For example, in a negotiations conference call between two organizations, individuals within an organization can use instant messaging to ask each other questions and make other comments about topics being discussed in the conference call without having to remember such questions and comments and discuss them after the call has completed. Being able to have such "off-line" discussions enables the conference call participants to be better informed and more efficient so that more work is accomplished during the conference call and fewer "follow-up" calls are needed to resolve negotiation issues.

One challenge in using instant messaging, however, is the user's maintenance of his or her instant messaging contacts. These lists are often referred to as "buddy lists." While the user may have a permanent group of contacts in his buddy list, such as colleagues with whom he frequently works, adding new contacts to the buddy list can be tedious and frustrating. Using the conference call negotiation example described above, the user would have to add any users with whom he wishes to have off-line discussions before he can establish an instant messaging sessions with such users.

Another example is a consultant or other facilitator that may work with various groups of people in an organization at different times. If a consultant is working with a particular department for a period of time, the users in that department would have to be added to the consultant's buddy list before the consultant could establish sessions with the users in that department. If the department being consulted by the consultant changes often, the consultant would spend considerable time adding users to his buddy list. In addition, so that the consultant's buddy list did not become unwieldy, the consultant would have to frequently remove previous clients and users from his buddy list.

What is needed, therefore, is a system and method that automatically adds contacts to a user's buddy list based upon data included in the user's calendar as well as organizational data maintained in a database. What is further needed, is a way of temporarily adding contacts to the user's buddy list so that the temporarily added contacts are automatically removed when no longer needed.

SUMMARY

It has been discovered that the aforementioned challenges are resolved using a system and method that automatically adds contacts to a user's instant messaging buddy list. The contacts are added based upon existing database (i.e., directory) information as well as meeting information extracted from the user's calendar.

When a meeting is set up, a meeting notice is sent to all of the meeting attendees. These meetings are often teleconference meetings with some or all of the attendees calling into the meeting from remote locations. The list of attendees is data that is included with the user's calendar. This list is used to automatically populate the user's buddy list. In one embodiment, a buddy list "group" is initialized for the meeting. The user's buddy list includes a number of groups, for both meetings as well as other categories (e.g., "friends," "coworkers," etc.). In this manner, the user can expand and collapse various groups and select contacts included in the groups. For example, the user can select a meeting group causing the list of attendees in the meeting to be displayed. The user can then select one or more of the displayed attendees in order to establish instant messaging sessions with the selected attendees.

Another way that contacts are added to a user's buddy list is by performing database queries. For example, a database directory may exist for an organization listing the various employees and other contacts for the organization along with information pertaining to the employees and contacts, such as the department to which the employees and contacts belong. Queries are performed against the database directory returning groups of contacts, such as all the contacts within a particular department. The group of contacts resulting from the query are then added to the user's buddy list.

Contacts added to the user's buddy list through the user's calendar (e.g., meeting attendees) or through database queries can be made permanent or temporary. When contacts are added temporarily, the contacts are automatically removed after a specified period of time. For example, meeting attendees added to the user's buddy list might be automatically removed after the meeting has taken place.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
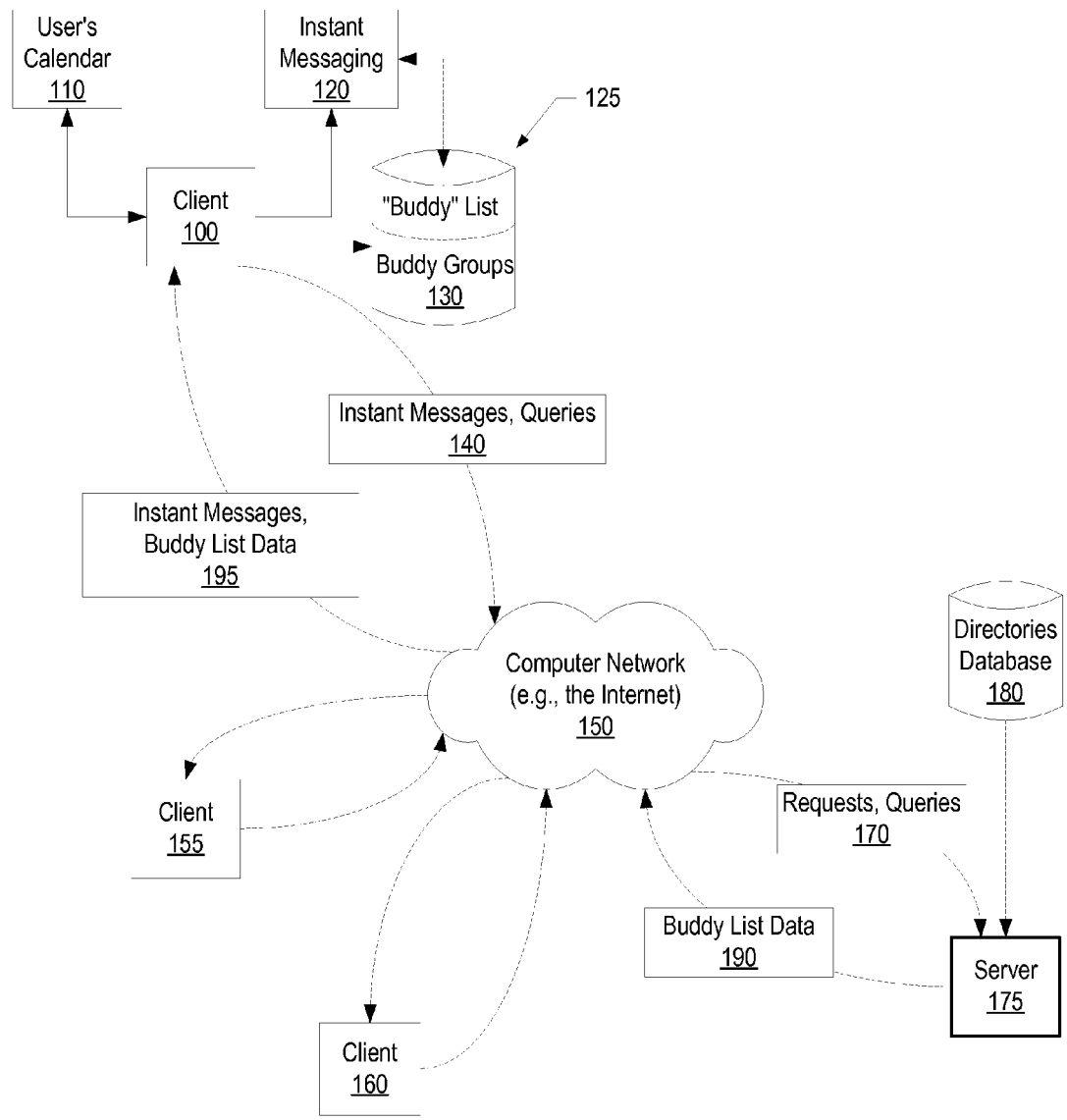
FIG. 1 is a network diagram showing the interaction between network components in automatically populating the user's buddy list.

FIG. 1 is a network diagram showing the interaction between network components in automatically populating the user's buddy list. Client 100 is a user's computer system that access to calendar function 110, instant messaging 120, and computer network 150, such as the Internet.

User's calendar 110 may be an application hosted by the user's computer system or may be a centralized calendaring application hosted on a central computer system accessed through the computer network. The user's calendar includes data regarding participants to meetings and other events that the user is scheduled to attend, either telephonically or in person.

Instant messaging function 120 is an application that allows the user to send and receive instant messages with other users that are included in the user's buddy list 125. The buddy list can include one or more buddy groups 130 for organizing the other users that the user can communicate with using instant messaging function 120. One way in which users and buddy groups are added to buddy list 125 is through extracting meeting participant information included in user's calendar function 110. For example, the user can decide to have participants for meetings added to the buddy list so that the user can establish an instant message session with other users attending the meeting. The users and buddy groups can be added to buddy list 125 on either a permanent basis. Examples of other users include clients 155 and 160 that are computer systems for other users that are also connected to computer network 150.

To establish an instant messaging session with another user, the user selects the other user from buddy list 125. The user can then instant message 140 to another user (e.g., client 155, 160, etc.). During the session, the user also receives instant messages 190 sent from one of the other users. The instant messages are displayed in a window of a display device included in client computer system 100 and viewed by the user.

Another way that users are added to buddy list 125 is through use of a database or directory. As used herein, the term database includes both databases managed by a database management system (DBMS) as well as directories, such as an LDAP directory. An example would be adding all members of a particular department to the user's buddy list. To add users from a database to the user's buddy list, the user sends query 145 through computer network 150 where it is received by server 175 as query request 170. Server 175 performs the requested query against database 180 and returns query results 185 to client 100 through computer network 150 which is received by client 100 as buddy list data 195 and added to buddy list 125. While a separate server (server 175) is shown accessing database 180, if client 100 has direct access to the database (e.g., database 180), then the client can perform the query directly without needing the server to perform the request.

Figure 2:
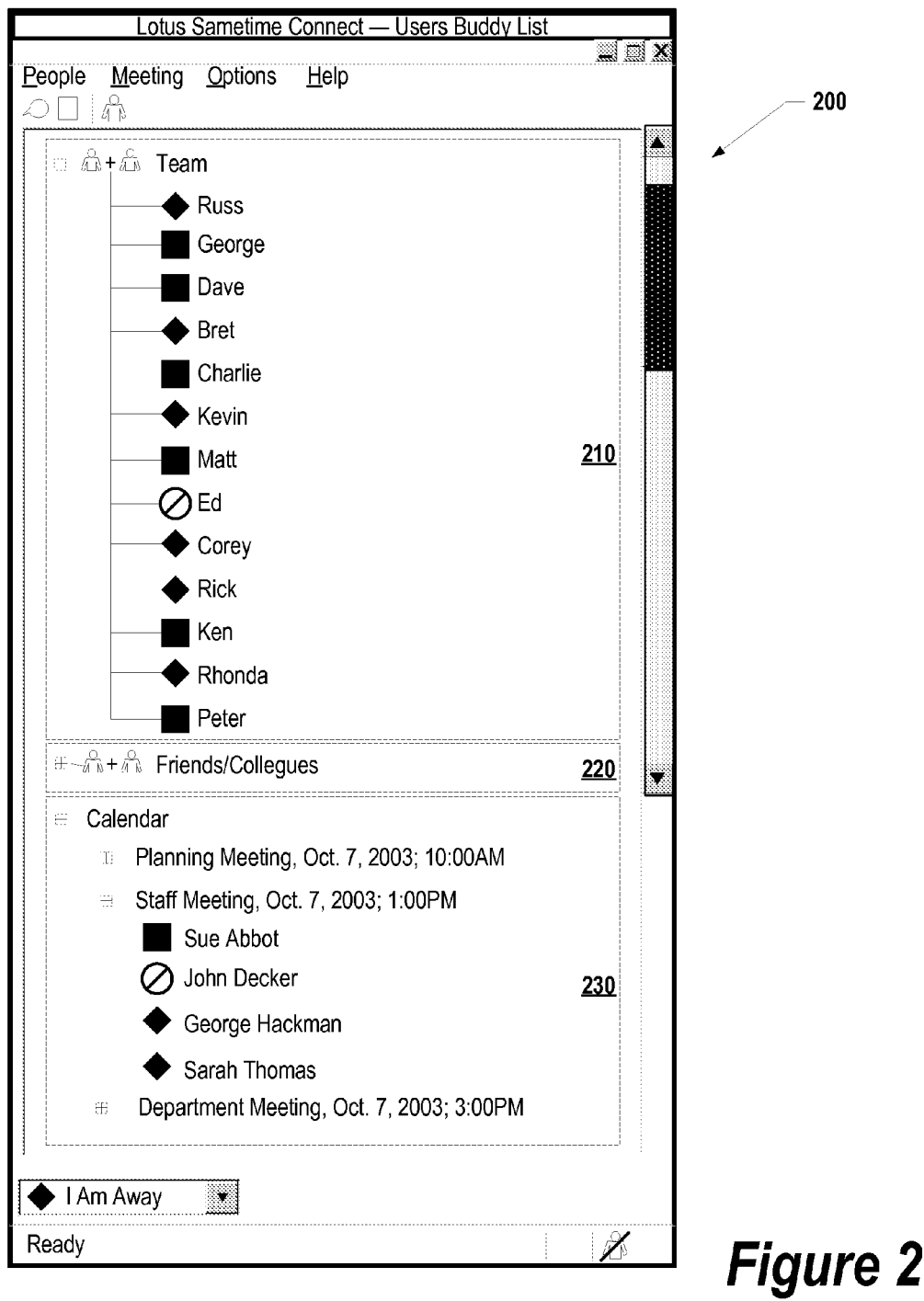
FIG. 2 is a screen diagram showing a user's buddy list with entries added from the user's calendar.

FIG. 2 is a screen diagram showing a user's buddy list with entries added from the user's calendar. Window 200 shows the user's buddy list which has three different buddy groups: group 210 ("Team"), group 220 ("Friends/Colleagues"), and group 230 ("Calendar"). Groups 210 and 230 are shown as "expanded" (i.e., contacts within the groups viewable) while group 220 is shown as "collapsed" (i.e., contacts within the group not displayed until the group is selected).

Contacts can be added to the lists manually or automatically. For example, if contacts within the "Team" group are in the same department, the user can run a query to add some or all of the contacts (see FIG. 3 and corresponding text for an example and FIG. 6 and corresponding text for a flowchart of adding a list of contacts based on a query). The symbol next to the contact names indicates whether the contact is away, available, or unavailable. If the user wishes to begin an instant messaging session with one of the contacts, he simply selects the desired contact from the list.

Group 230 shows calendar entries, in particular, contacts for various meetings that are on the user's calendar. In the example shown, there are three meetings that appear in the calendar group: a planning meeting, a staff meeting, and a department meeting. Of these, the planning and department meeting are shown as collapsed, while the staff meeting is shown as expanded, showing the contacts. Similarly to the contacts within the "Team" group, if the user wishes to begin an instant messaging session with a contact in the staff meeting, the user simply selects the desired contact. In the example shown, only one of the staff meeting contacts (Sue Abbot) is currently available for an instant messaging session, the other are either away or unavailable. For further details on dialogs used to add calendar contacts to the user's instant messaging buddy list, see FIGS. 4 and 5 and corresponding text. For details regarding the steps taken to add contacts from calendar data, see the flowchart in FIG. 7 and corresponding text.

Figure 3:
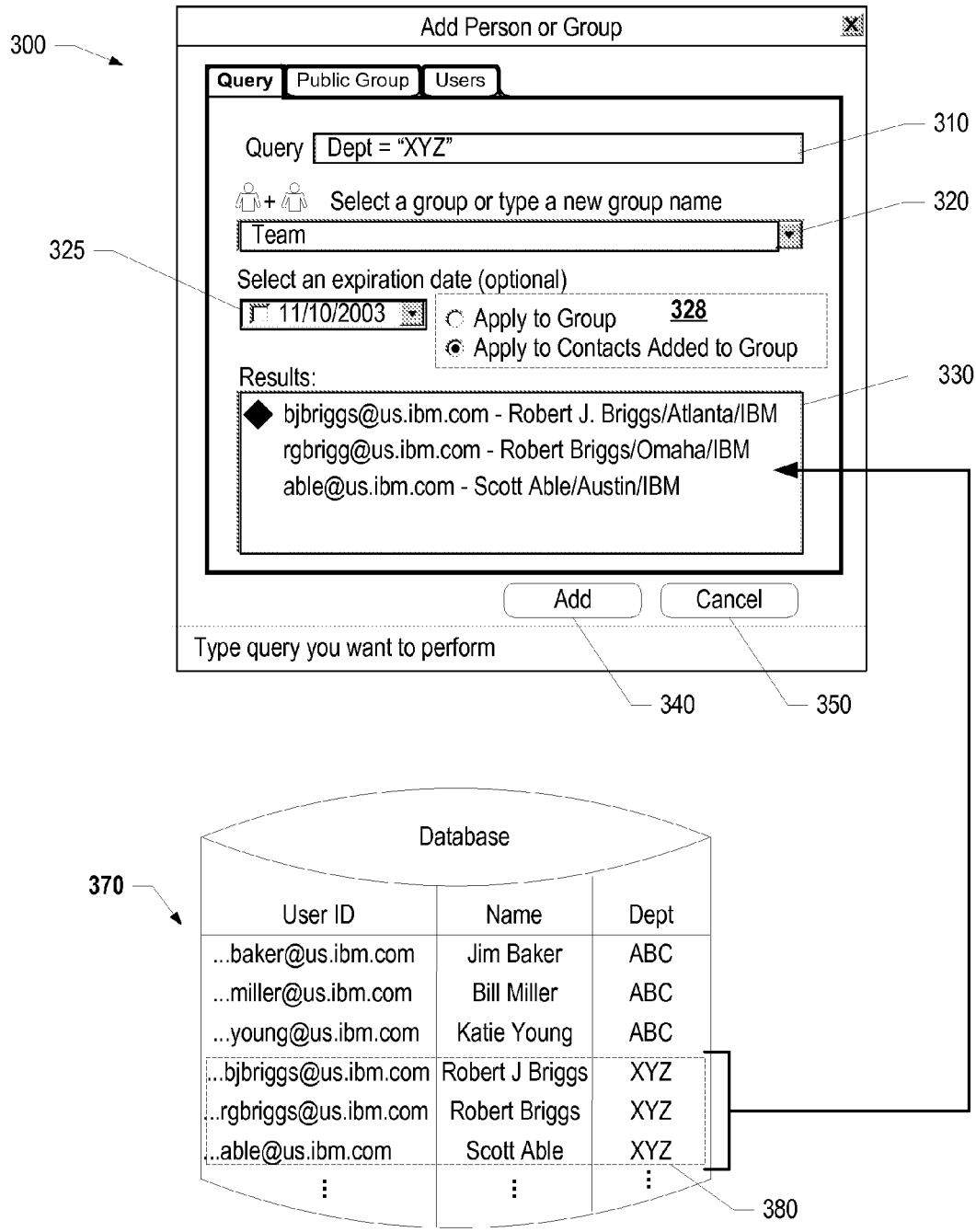
FIG. 3 is a screen diagram showing a window with instant messenger contacts pulled from a database.

FIG. 3 is a screen diagram showing a window with instant messenger contacts pulled from a database. Dialog window 300 includes text box 310 for entering a query, combo box 320 for choosing a buddy group to which contacts are added, date picker 325 for choosing an optional expiration date for the group or contacts being added, and results window 330 for displaying the results of the user's query.

In the example shown, the user has selected a query of all records for a department named "XYZ" by entering a query of "Dept='XYZ'" in text box 310. In another embodiment, the query is entered using a database wizard that asks the user a series of questions (i.e., what field(s) to search, what criteria to search for, etc.). The user has selected that any contacts added as a result of the search will be added to the "Team" buddy group using combo box 320. If the user selects combo box 320, a list of the currently available buddy groups is presented to the user in a drop down list and the user can select one of the displayed buddy groups. The user can also type a new buddy group name in combo box 320 to request that contacts be added to a new buddy group. Date picker control 325 allows the user to select the drop down arrow whereupon a calendar is displayed allowing the user to select a date. Date picker control 325 also includes a checkbox. The expiration date is set if the user checks the checkbox, the expiration date is not set if the checkbox is left blank. Radio button control list 328 includes two radio buttons that allow the user to specify whether the expiration date (if provided) applies to the entire group or only to those contacts that are added to the group using the current dialog. In one embodiment, the management of the user's buddy groups is specified by a preset policy or configuration option.

When the user enters the query, records are retrieved from database 370. In the example shown, records 380 are retrieved as these records are for individuals in the requested department ("XYZ"). The retrieved records are displayed in results window 330. If the user wishes to add the displayed record to the selected buddy group, he selects "Add" command button 340 whereupon the displayed records are added to the buddy group (either temporarily or permanently as indicated by whether an expiration date has been set). On the other hand, if the user decides not to add the displayed contacts to the buddy list, the user selects "Cancel" command button 350 whereupon no additions are made to the user's buddy list and dialog window 300 closes.

Figure 4:
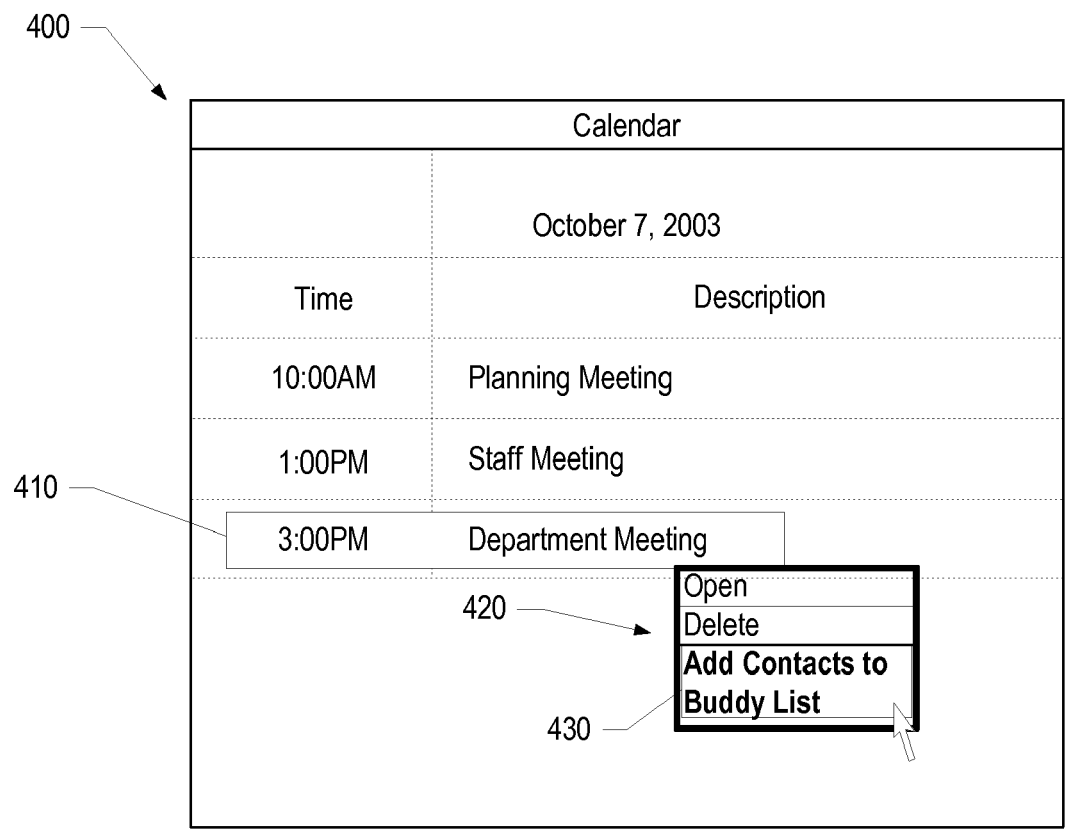
FIG. 4 is a screen diagram showing the user selecting a calendar entry to add meeting participants to the user's buddy list.

FIG. 4 is a screen diagram showing the user selecting a calendar entry to add meeting participants to the user's buddy list. Window 400 is a view of the user's calendar on which three entries appear for the given date. Entry 410 has been selected by the user (using a pointing device, keyboard, voice command, or any other selection means) and appears highlighted.

In response to selecting calendar entry 410, item menu 420 appears with three options. Option 430 has been selected indicating that the user wishes to add participants (contacts) that are attending the selected meeting to his instant messaging buddy list. In response to selecting this option the contacts are added to the user's buddy list. In one embodiment, the contacts that are included in the calendar entry are automatically added to the buddy list or to a buddy list group (i.e., a new group could be created with a title indicative of the meeting). In another embodiment, a menu is presented to the user allowing the user to select options for how the contacts are to be added to his buddy list (for further details regarding this embodiment, see FIG. 5).

Figure 5:
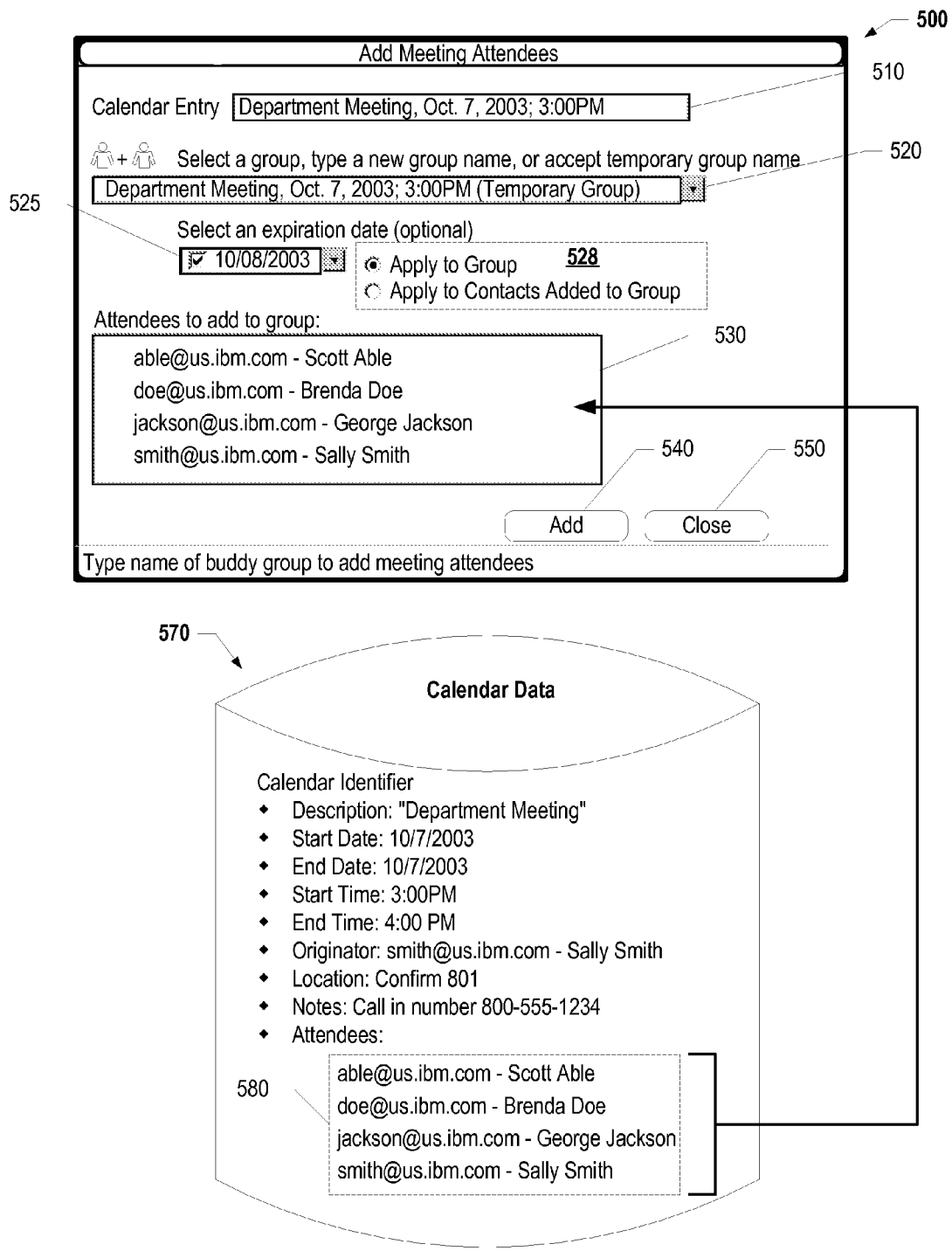
FIG. 5 is a screen diagram showing a window dialog used to add meeting attendees to the user's buddy list.

FIG. 5 is a screen diagram showing a window dialog used to add meeting attendees to the user's buddy list. Window 500 appears when the user requests adding contacts included in a calendar entry (e.g., an entry regarding a meeting with various attendees). Window 500 is provided to allow the user to determine where in the user's buddy list the contacts should be added, whether the additions are permanent or temporary, an expiration date for temporarily added contacts. Window 500 also allows the user to preview the list of contacts before adding them to the user's buddy list.

Window 500 includes text box 510 which displays the calendar entry. In the example shown, the calendar entry is for a department meeting being held on Oct. 7, 2003. If this is not the entry for which the user wishes to add contacts, the user can exit by selecting "Cancel" command button 550.

A default buddy group has been created with a name that corresponds to the calendar entry. This buddy group name appears in combo box 520. Any contacts included in the calendar entry will be added to this buddy group. However, by selecting combo box 520 a list of other buddy group names will appear and the user can select a different buddy group where the contacts will be stored. The user can also type a new buddy group name in combo box 320 to request that contacts be added to a new buddy group. In one embodiment, the management of the user's buddy groups is specified by a preset policy or configuration option.

Date picker control 525 allows the user to select the drop down arrow whereupon a calendar is displayed allowing the user to select a date. Date picker control 525 also includes a checkbox. The expiration date is set if the user checks the checkbox, the expiration date is not set if the checkbox is left blank. By default, the expiration date is set for the day following the calendar entry and the contacts will be automatically removed from the user's buddy list upon the expiration date.

Radio button control list 528 includes two radio buttons that allow the user to specify whether the expiration date applies to the entire group or only to those contacts that are added to the group using the current dialog. By default, the option has been selected that the entire group will be removed as the default group name created by the system corresponds to the calendar entry.

Contacts included in the selected calendar entry are retrieved from calendar database 570. Calendar database includes many fields about each of the calendar entries, including attendees list 580. Attendees list 580 is retrieved and displayed to the user in window 530. The user can review the contacts that appear in window 530 and decide whether to add them to his buddy list, which buddy group to add them to, and whether the additions are permanent or temporary. When the user has made his decisions and selections, he selects "Add" command button 540 to add the contacts to the selected buddy group. If the user decides not to add the contacts, he selects "Cancel" command button whereupon the contacts are not added to the user's buddy list and window 500 closes.

Figure 6:
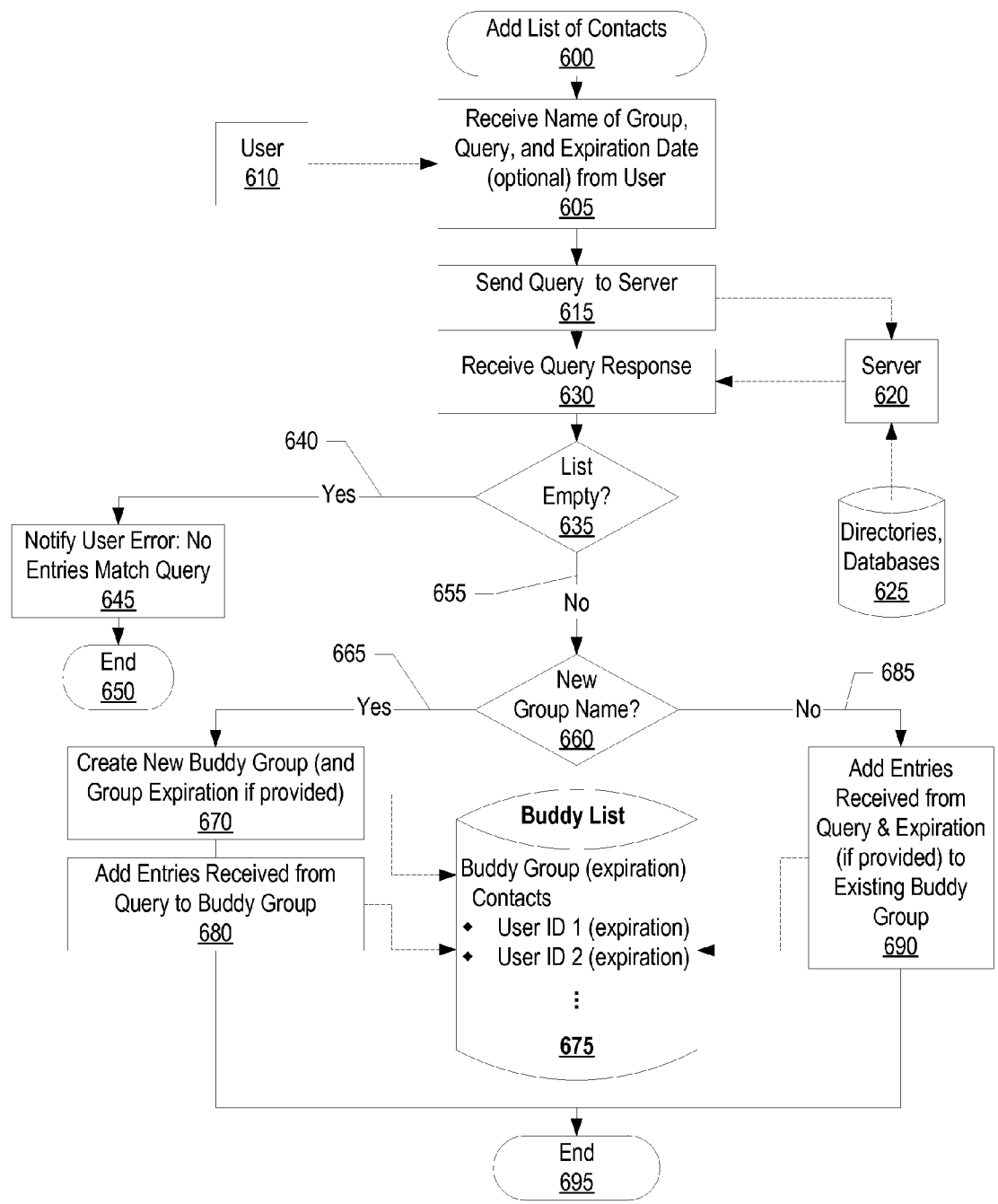
FIG. 6 is a flowchart showing steps taken to add a group of contacts to a user's buddy list.

FIG. 6 is a flowchart showing steps taken to add a group of contacts to a user's buddy list. Processing commences at 600 whereupon, at step 605, the name of the buddy group, the requested query, and (optionally) an expiration date are provided by user 610. In one embodiment, a database wizard is used by the user to formulate the user's query so that the user does not need to have detailed knowledge of the field names or query syntax.

At step 615, the query is sent to server 620 for processing. Server 620 processes the requested query using database 625 and returns the results of the query where they are received at step 630. Steps 615 through 630 assume that the user either does not have direct access to the database or that the database is remote from the user's computer system. If this is not the case, then the user's computer system can directly perform the query using a directly accessible database.

A determination is made as to whether the results returned from the query are empty indicating that no records (contacts) satisfied the user's query request (decision 635). If the list is empty, decision 635 branches to "yes" branch 640 whereupon, at step 645, an error message is returned to the user indicating that no records matched the user's query request and processing ends at 650. On the other hand, if the list was not empty, decision 635 branches to "no" branch 655 in order to process the list.

A determination is made as to whether the buddy group name to which the contacts are being added is a new, or existing, buddy group (decision 660). If it is a new buddy group, decision 660 branches to "yes" branch 665 whereupon, at step 670, the new buddy group is created in buddy list data store 675. In addition, if the new buddy group is temporary, the expiration date of the new buddy group is written to the new buddy group data. At step 680, the entries received as a result of the query are added to the newly created buddy group stored in data store 675.

Returning to decision 660, if the entries are being added to an existing buddy group, decision 660 branches to "no" branch 685 whereupon, at step 690, the entries received as a result of the query are added to the existing buddy group stored in data store 675. In addition, if an expiration date has been specified for one or more of the contacts being added, the expiration date is written to buddy list data store 675 and associated with the temporary contacts. Processing thereafter ends at 695.

Figure 7:
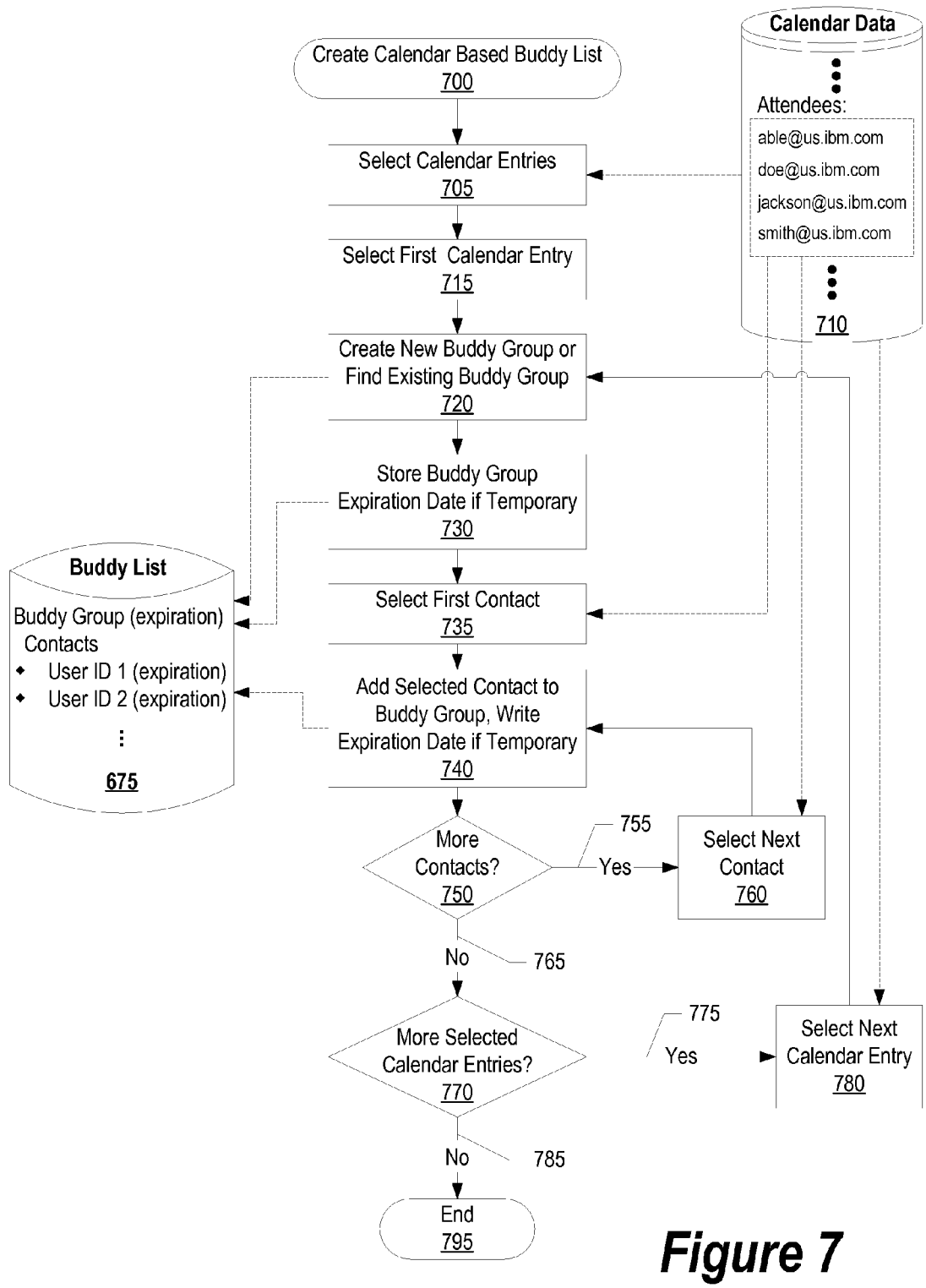
FIG. 7 is a flowchart showing steps to create a buddy lists based upon attendees found in the user's calendar entries.

FIG. 7 is a flowchart showing steps to create a buddy lists based upon attendees found in the user's calendar entries. Processing commences at 700 whereupon, at step 705, one or more calendar entries are selected from calendar data store 710 (calendar data store 710 including participant contact data corresponding to various calendar entries).

At step 715, the first selected calendar entry is selected. At step 720, a buddy group name is either created if the buddy group is new (i.e., the name corresponding to the calendar entry), or an existing buddy group within buddy list 675 is located. In one embodiment, the management of the user's buddy groups is specified by a preset policy or configuration option.

If the buddy group is a temporary buddy group, the expiration date corresponding to the buddy group is written to buddy list 675 at step 730. The first contact from the selected calendar entry is selected at step 735. The selected contact is added to the selected buddy group at step 740. If the contact is being added temporarily, the expiration date that applies to the contact is also recorded along with the contact information.

A determination is made as to whether there are more contacts in the calendar entry (e.g., meeting, etc.) to add to the user's buddy list (decision 750). If there are more contacts to add, decision 750 branches to "yes" branch 755 whereupon, at step 760, the next contact in the calendar entry is retrieved from calendar data store 710 and processing loops back to add the contact to the user's buddy list. This looping continues until all contacts in the calendar entry have been processed, at which point decision 750 branches to "no" branch 765.

A determination is made as to whether there are more calendar entries, such as meetings, that have been selected to process (decision 770). If there are more selected calendar entries to process, decision 770 branches to "yes" branch 775 whereupon, at step 780, the next calendar entry is selected from calendar data store 710 and processing loops back to process the selected calendar entry. This looping continues until all selected calendar entries have been processed, at which point decision 770 branches to "no" branch 785 and processing ends at 795.

Figure 8:
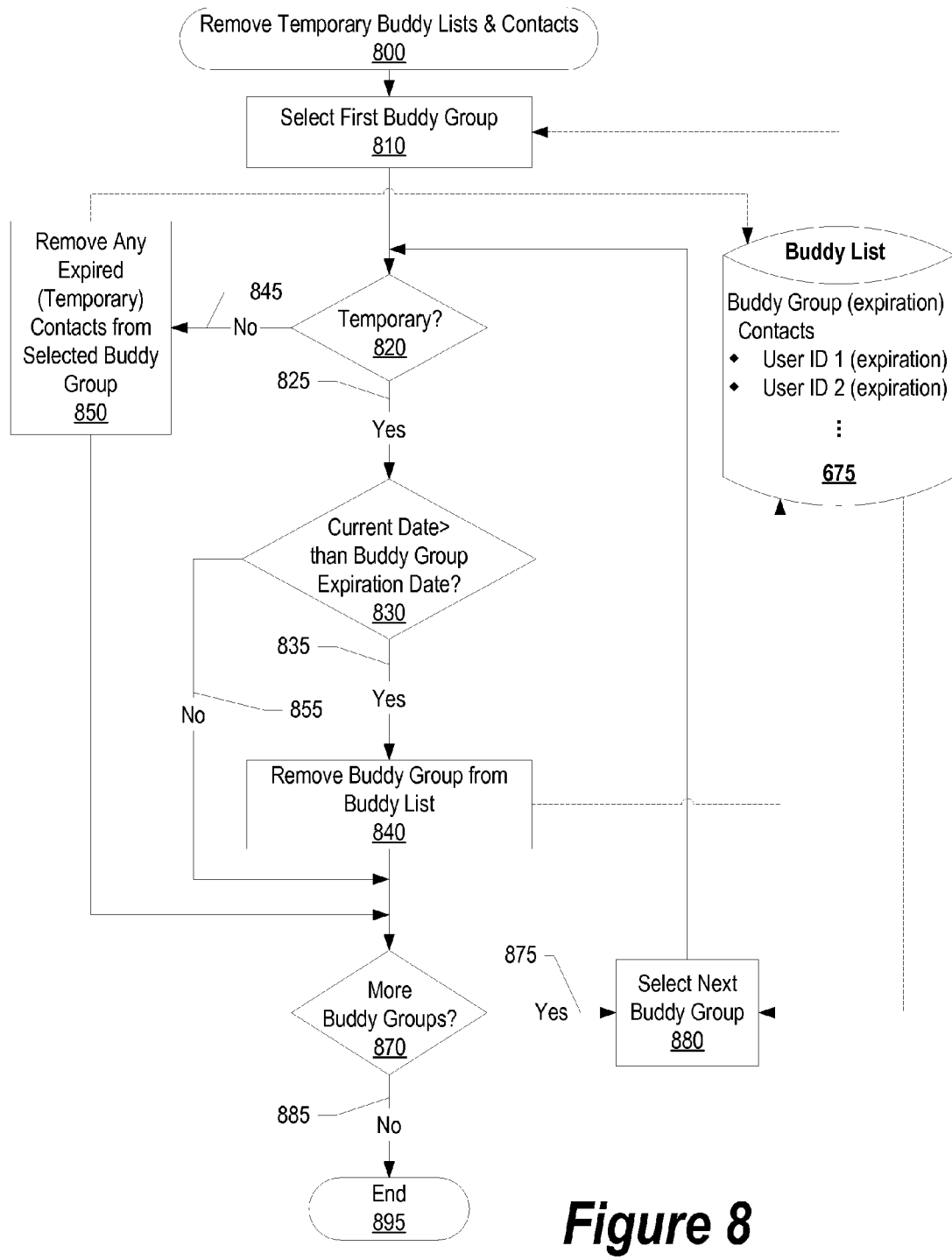
FIG. 8 is a flowchart showing steps taken to remove temporary buddy groups and contacts from the user's buddy list.

FIG. 8 is a flowchart showing steps taken to remove temporary buddy groups and contacts from the user's buddy list. As explained in FIGS. 7 and 8 above, contacts and buddy groups can be stored temporarily. For example, contacts for a given meeting can be stored in the user's buddy list until the date of the meeting is past.

Processing commences at 800 whereupon, at step 810 the first buddy group within buddy list 675 is selected. A determination is made as to whether the entire buddy group is a temporary buddy group (decision 820). If the selected buddy group is temporary (e.g., a group containing the contacts for a particular meeting, etc.), decision 820 branches to "yes" branch 825 whereupon another determination is made as to whether the current date (i.e., system date) is greater than (after) the buddy group expiration date (decision 830). If the current date is greater than the buddy group expiration date, decision 830 branches to "yes" branch 835 whereupon, at step 840, the buddy group is removed from buddy list 675. On the other hand, if the current date is not greater than the buddy list expiration date (i.e., the buddy group has not yet expired), decision 830 branches to "no" branch 855 bypassing step 840.

Returning to decision 820, if the selected buddy group is not a temporary buddy group, decision 820 branches to "no" branch 845 whereupon, at step 850, an individual expired contacts within the group are removed from the buddy group. For example, a temporary worker or visitor may be added to one of the user's permanent buddy groups for the duration of their work. When the date assigned to the temporary worker/visitor has been reached, the contact information is removed, at step 850, from one of the user's permanent buddy groups.

A determination is made as to whether there are more buddy groups to process (decision 870). If there are more buddy groups to process, decision 870 branches to "yes" branch 875 whereupon, at step 880, the next buddy group within the user's buddy list is selected from buddy list data store 675 and processing loops back to determine whether the buddy group, or temporary contacts within the buddy group, should be removed. This looping continues until all buddy groups have been processed, at which point decision 870 branches to "no" branch 885 and processing ends at 895.

Figure 9:
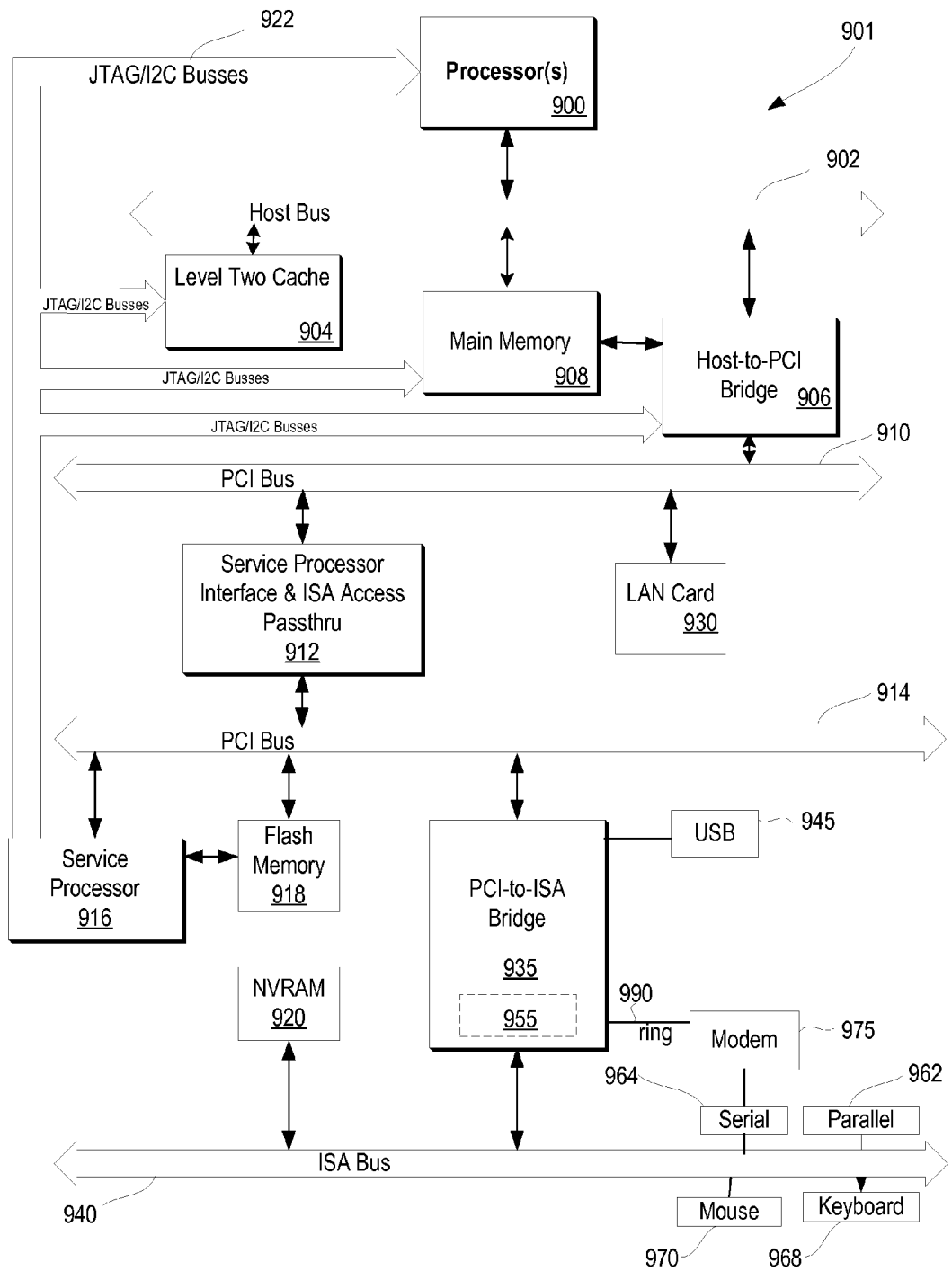
FIG. 9 is a block diagram of an information handling system capable of implementing the present invention.

FIG. 9 illustrates information handling system 901 which is a simplified example of a computer system capable of performing the computing operations described herein. Computer system 901 includes processor 900 which is coupled to host bus 902. A level two (L2) cache memory 904 is also coupled to host bus 902. Host-to-PCI bridge 906 is coupled to main memory 908, includes cache memory and main memory control functions, and provides bus control to handle transfers among PCI bus 910, processor 900, L2 cache 904, main memory 908, and host bus 902. Main memory 908 is coupled to Host-to-PCI bridge 906 as well as host bus 902. Devices used solely by host processor(s) 900, such as LAN card 930, are coupled to PCI bus 910. Service Processor Interface and ISA Access Pass-through 912 provides an interface between PCI bus 910 and PCI bus 914. In this manner, PCI bus 914 is insulated from PCI bus 910. Devices, such as flash memory 918, are coupled to PCI bus 914. In one implementation, flash memory 918 includes BIOS code that incorporates the necessary processor executable code for a variety of low-level system functions and system boot functions.

PCI bus 914 provides an interface for a variety of devices that are shared by host processor(s) 900 and Service Processor 916 including, for example, flash memory 918. PCI-to-ISA bridge 935 provides bus control to handle transfers between PCI bus 914 and ISA bus 940, universal serial bus (USB) functionality 945, power management functionality 955, and can include other functional elements not shown, such as a real-time clock (RTC), DMA control, interrupt support, and system management bus support. Nonvolatile RAM 920 is attached to ISA Bus 940. Service Processor 916 includes JTAG and I2C busses 922 for communication with processor(s) 900 during initialization steps. JTAG/I2C busses 922 are also coupled to L2 cache 904, Host-to-PCI bridge 906, and main memory 908 providing a communications path between the processor, the Service Processor, the L2 cache, the Host-to-PCI bridge, and the main memory. Service Processor 916 also has access to system power resources for powering down information handling device 901.

Peripheral devices and input/output (I/O) devices can be attached to various interfaces (e.g., parallel interface 962, serial interface 964, keyboard interface 968, and mouse interface 970 coupled to ISA bus 940. Alternatively, many I/O devices can be accommodated by a super I/O controller (not shown) attached to ISA bus 940.

In order to attach computer system 901 to another computer system to copy files over a network, LAN card 930 is coupled to PCI bus 910. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the processes described herein, this computer system is simply one example of a computer system. Those skilled in the art will appreciate that many other computer system designs are capable of performing the processes described herein.

While the computer system described in FIG. 9 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method of managing an instant messenger list, said method comprising:

selecting, by a user, one or more calendar entries from an electronic calendar that corresponds to the user, wherein the selected one or more calendar entries appear highlighted;

retrieving, from the selected one or more calendar entries, calendar data that includes contact data for a plurality of contacts corresponding to the selected one or more calendar entries;

adding the retrieved contact data to the instant messenger list associated with an instant messaging computer application used by the user;

selecting one of the contacts added to the user's instant messenger list;

establishing an instant messaging session with the selected contact;

creating one or more buddy groups within the user's instant messenger list by automatically adding the contacts to the one or more buddy groups, wherein the created one or more buddy groups corresponds to the selected one or more calendar entries;

storing the retrieved contact data in the one or more buddy groups, wherein the contact data retrieved includes the contacts' information;

identifying that at least one of the contacts added to the user's instant messenger list is a temporary contact;

storing an expiration date corresponding to each of the temporary contacts;

periodically comparing a current date to the expiration dates stored for the temporary contacts; and in response to the comparison, removing the contact data corresponding to the temporary contacts when the expiration date has occurred.

2. The method as described in claim 1 further comprising:

prior to the reception of the contact data:

constructing a query of contact information requested by the user; and performing the query at a database, wherein the database stores the contact information that includes the contact data corresponding to the contacts; and wherein the contact data received is a result of the performed query.

3. The method as described in claim 2 further comprising:

receiving an expiration date corresponding to the query;

storing the expiration date with the contact data received as a result of the query;

periodically comparing a current date to the expiration date; and removing the contact data in response to the comparison.

4. The method as described in claim 1 further comprising:

prior to the reception of the contact data:

selecting one or more calendar entries from an electronic calendar corresponding to the user; and retrieving, from the selected calendar entries, calendar data that includes participant information for participants of the selected calendar entries; and wherein the contact data received includes the participant information.

5. The method as described in claim 1 further comprising:

storing an expiration date corresponding to the created buddy group, wherein the expiration date is derived from a date of the selected calendar entry;

periodically comparing a current date to the expiration date stored for the buddy group; and removing the buddy group, including the contact data added to the buddy group, in response to the comparison.

6. The method as described in claim 1 further comprising:
adding the received contact data to a buddy group included with the buddy list, wherein the buddy group to which the contact data is added is determined by a predefined policy.

7. An information handling system comprising:
one or more processors;
a memory accessible by at least one of the processors;
a network interface connecting the information handling system to a computer network;
a software tool for managing an instant messenger list, the software tool including software stored in the memory, when executed by the processor, effective to:
select, by a user of the information handling system, one or more calendar entries from a user's electronic calendar, wherein the selected one or more calendar entries appear highlighted;
retrieve, from the selected one or more calendar entries, calendar data that includes contact data corresponding to a plurality of contacts of the selected one or more calendar entries;
add the retrieved contact data to the instant messenger list associated with a user's instant messaging computer application used by the user;
select, by the user, one of the contacts added to the user's instant messenger list;
establish an instant messaging session with the selected one of the contacts;
create one or more buddy groups within the user's instant messenger list by automatically adding the contacts to the one or more buddy groups, wherein the created one or more buddy groups corresponds to the selected one or more calendar entries;
store the retrieved contact data in the one or more buddy groups, wherein the contact data retrieved includes the contacts' information;
periodically compare a current date to expiration dates stored for temporary contacts; and
in response to the comparison, remove the contact data corresponding to the temporary contacts when the expiration date associated with the contact data has occurred.

8. The information handling system as described in claim 7 further comprising software effective to:
prior to the reception of the contact data:
construct a query of contact information requested by the user; and
perform the query at a database, wherein the database stores the contact information that includes the contact data corresponding to the contacts; and
wherein the contact data received is a result of the performed query.

9. The information handling system as described in claim 8 further comprising software effective to:
receive an expiration date corresponding to the query;
store the expiration date with the contact data received as a result of the query;
periodically compare a current date to the expiration date; and
remove the contact data in response to the comparison.

10. The information handling system as described in claim 7 further comprising software effective to:
prior to the reception of the contact data:
select one or more calendar entries from an electronic calendar corresponding to the user; and
retrieve, from the selected calendar entries, calendar data that includes participant information for participants of the selected calendar entries; and
wherein the contact data received includes the participant information.

11. The information handling system as described in claim 7 further comprising software effective to:
store an expiration date corresponding to the created buddy group, wherein the expiration date is derived from the date of the selected calendar entry;
periodically compare a current date to the expiration date stored for the buddy group; and
remove the buddy group, including the contact data added to the buddy group, in response to the comparison.

12. The information handling system as described in claim 7 further comprising software effective to:
add the received contact data to a buddy group included with the buddy list, wherein the buddy group to which the contact data is added is determined by a predefined policy.

13. A computer program product stored on a computer operable storage media for managing instant messenger list, said computer program product comprising software that, when executed by a data processing system, causes the data processing system to perform actions that include:
selecting, by a user, one or more calendar entries from an electronic calendar that corresponds to the user, wherein the selected one or more calendar entries appear highlighted;
retrieving, from the selected one or more calendar entries, calendar data that includes contact data corresponding to a plurality of contacts of the selected one or more calendar entries;
adding the retrieved contact data to an instant messenger list associated with an instant messaging computer application used by the user;
selecting one of the contacts added to the user's instant messenger list;
establishing an instant messaging session with the selected contact;
creating one or more buddy groups within the user's instant messenger list by automatically adding the contacts to the one or more buddy groups, wherein the created one or more buddy groups corresponds to the selected one or more calendar entries;
storing the retrieved contact data in the one or more buddy groups, wherein the contact data retrieved includes the contacts' information;
identifying that at least one of the contacts added to the user's instant messenger list is a temporary contact;
storing an expiration date corresponding to each of the temporary contacts;
periodically comparing a current date to the expiration dates stored for the temporary contacts; and
in response to the comparison, removing the contact data corresponding the temporary contacts when the expiration date associated with the contact data has occurred.

14. The computer program product as described in claim 13 wherein the software performs further actions comprising:
prior to the retrieving of the contact data:
constructing a query of contact information requested by the user; and
performing the query at a database, wherein the database stores the contact information that includes the contact data corresponding to the contacts; and wherein the contact data retrieved is a result of the performed query.

15. The computer program product as described in claim 14 wherein the software performs further actions comprising:
   receiving an expiration date corresponding to the query;
   storing the expiration date with the contact data received as a result of the query;
   periodically comparing a current date to the expiration date; and
   removing the contact data in response to the comparison.

16. The computer program product as described in claim 13 wherein the software performs further actions comprising:
   prior to the retrieving of the contact data:
      selecting one or more calendar entries from an electronic calendar corresponding to the user; and
      retrieving, from the selected calendar entries, calendar data that includes participant information for participants of the selected calendar entries; and
   wherein the contact data retrieved includes the participant information.

17. The computer program product as described in claim 13 wherein the software performs further actions comprising:
   storing an expiration date corresponding to the created buddy group, wherein the expiration date is derived from the date of the selected calendar entry;
   periodically comparing a current date to the expiration date stored for the buddy group; and
   removing the buddy group, including the contact data added to the buddy group, in response to the comparison.

18. The computer program product as described in claim 13 wherein the software performs further actions comprising:
   adding the retrieved contact data to a buddy group included with the buddy list, wherein the buddy group to which the contact data is added is determined by a predefined policy.

19. A computer-implemented method of managing instant messenger list, said method comprising:
   selecting, by a user, one or more calendar entries from an electronic calendar that corresponds to the user, wherein the selected one or more calendar entries appear highlighted;
   retrieving, from the selected one or more calendar entries, calendar data that includes contact data for a plurality of contacts corresponding to selected one or more calendar entries;
   creating one or more buddy groups within the user's buddy list by automatically adding the contacts to the one or more buddy groups, wherein the created one or more buddy groups corresponds to the one or more selected calendar entries from the electronic calendar corresponding to the user, and wherein the user's buddy list is associated with an instant messaging computer application;
   identifying an expiration date of the buddy group, the expiration date derived from a date of the selected one or more calendar entries;
   retrieving, from the selected one or more calendar entries, calendar data that includes contact data for participants of the selected one or more calendar entries;
   storing the retrieved contact data in the one or more buddy groups, wherein the contact data retrieved includes participant information;
   periodically comparing a current date to an expiration date corresponding to the one or more buddy groups; and
   removing the one or more buddy groups, including the contact data added to the one or more buddy groups, in response to the comparison.

20. An information handling system comprising:
   one or more processors;
   a memory accessible by at least one of the processors;
   a network interface connecting the information handling system to a computer network;
   a software tool for managing an instant messenger list, the software tool including software effective to:
      select, by a user, one or more calendar entries from an electronic calendar that corresponds to the user, wherein the selected one or more calendar entries appear highlighted;
      retrieve, from the selected one or more calendar entries, calendar data that includes contact data for a plurality of contacts of the selected one or more calendar entries;
      create one or more buddy groups within a user's buddy list by automatically adding the contacts to the one or more buddy groups, wherein the created one or more buddy groups corresponds to the selected one or more calendar entries from the electronic calendar corresponding to the user, and wherein the user's buddy list is associated with an instant messaging computer application;
      identify an expiration date of each of the one or more buddy groups, the expiration date derived from a date of the selected one or more calendar entries;
      retrieve, from the selected one or more calendar entries, calendar data that includes contact data for participants of the selected one or more calendar entries;
      store the retrieved contact data in the one or more buddy groups, wherein the contact data retrieved includes the participant information;
      periodically compare a current date to the expiration date corresponding to each of the one or more buddy groups; and
      remove the one or more buddy groups, including the contact data added to the one or more buddy groups, in response to the comparison.

21. A computer program product stored on a computer operable storage media for managing instant messenger lists, said computer program product comprising software that, when executed by a data processing system, causes the data processing system to perform actions that include:
   selecting, by a user, one or more calendar entries from an electronic calendar that corresponds to the user, wherein the selected one or more calendar entries appear highlighted;
   in response to the selecting, retrieving, from the selected one or more calendar entries, calendar data that includes contact data for a plurality of contacts of the selected one or more calendar entries;
   creating one or more buddy groups within the user's buddy list by automatically adding the contacts to the one or more buddy groups, wherein the created one or more buddy groups corresponds to the one or more selected calendar entries from the electronic calendar corresponding to the user, and wherein the user's buddy list is associated with an instant messaging computer application;

identifying an expiration date of each of the one or more buddy groups, the expiration date derived from a date of the selected one or more calendar entries;

retrieving, from the selected one or more calendar entries, calendar data that includes contact data for participants of the selected one or more calendar entries;

storing the retrieved contact data in the one or more buddy groups, wherein the contact data retrieved includes participant information;

periodically comparing a current date to the expiration date corresponding to each of the buddy groups; and removing each of the buddy groups, including the contact data added to the buddy groups, in response to the comparison.

* * * * *